US012616099B2

(12) United States Patent
Casadei et al.

(10) Patent No.: US 12,616,099 B2
(45) Date of Patent: May 5, 2026

(54) METHOD FOR CONTROLLING WRAPPING OPERATIONS

(71) Applicant: KVERNELAND GROUP RAVENNA S.R.L., Russi (IT)

(72) Inventors: Valerio Casadei, Cesena (IT); Cosimo Frascella, Lugo (IT)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 47 days.

(21) Appl. No.: 17/802,163

(22) PCT Filed: Mar. 29, 2021

(86) PCT No.: PCT/IB2021/052572
§ 371 (c)(1),
(2) Date: Aug. 25, 2022

(87) PCT Pub. No.: WO2021/191880
PCT Pub. Date: Sep. 30, 2021

(65) Prior Publication Data
US 2023/0354750 A1 Nov. 9, 2023

(30) Foreign Application Priority Data

Mar. 27, 2020 (IT) ........................ 102020000006478

(51) Int. Cl.
*A01F 15/07* (2006.01)
*B65B 11/04* (2006.01)
(Continued)

(52) U.S. Cl.
CPC .......... *A01F 15/071* (2013.01); *B65B 11/045* (2013.01); *B65B 41/16* (2013.01);
(Continued)

(58) Field of Classification Search
CPC ......... B65B 11/045; B65B 41/16; B65B 1/06; A01F 15/071; A01F 2015/0725; A01F 2015/073
(Continued)

(56) References Cited

U.S. PATENT DOCUMENTS

| 5,048,271 A | * | 9/1991 | Walton | .................. | A01F 15/071 |
| | | | | | 53/118 |
| 6,070,400 A | | 6/2000 | Peeters et al. | | |

(Continued)

FOREIGN PATENT DOCUMENTS

| DE | 102014211712 A1 | 2/2015 |
| EP | 0792577 A2 | 9/1997 |

(Continued)

OTHER PUBLICATIONS

PCT International Search Report and Written Opinion from PCT International Application No. PCT/IB2021/052572, International Filing Date Mar. 29, 2021 (14 pgs).

*Primary Examiner* — Sameh Tawfik
(74) *Attorney, Agent, or Firm* — Wentsler LLC

(57) ABSTRACT

A method for controlling, through a mobile device, wrapping operations in a wrapper for wrapping a round bale with a film, comprises the following steps, performed by a processor of the mobile device: coupling the mobile device to a control unit of the wrapper, by sending a coupling signal to the control unit; receiving control inputs from a user, through an interaction of the user with the mobile device; elaborating the control inputs and generating, based on the control inputs, a command message; sending the command message to the control unit of the wrapper; receiving, at the processor of the mobile device, operation data from the control unit of the wrapper, the operation data being representative of operations performed by the wrapper.

23 Claims, 4 Drawing Sheets

(51) Int. Cl.
　　B65B 41/16　　　　(2006.01)
　　B65B 61/06　　　　(2006.01)
(52) U.S. Cl.
　　CPC ...... B65B 61/06 (2013.01); *A01F 2015/0725*
　　　　　　　(2013.01); *A01F 2015/073* (2013.01)
(58) Field of Classification Search
　　USPC ........................................................ 53/461
　　See application file for complete search history.

(56) References Cited

U.S. PATENT DOCUMENTS

| | | | | |
|---|---|---|---|---|
| 7,643,938 | B2 * | 1/2010 | Adachi ..................... | G08G 1/20 |
| | | | | 701/485 |
| 9,165,127 | B2 | 10/2015 | Miura et al. | |
| 9,906,967 | B2 | 2/2018 | Inoue et al. | |
| 10,234,837 | B2 | 3/2019 | French, Jr. | |
| 2003/0098798 | A1 * | 5/2003 | Kato .................. | G05B 23/0272 |
| | | | | 340/679 |
| 2008/0015955 | A1 * | 1/2008 | Ehrman ................. | G06Q 10/06 |
| | | | | 705/28 |
| 2008/0154691 | A1 * | 6/2008 | Wellman ............ | G06Q 10/0639 |
| | | | | 705/7.26 |
| 2011/0023732 | A1 * | 2/2011 | Herron .................... | A01F 15/08 |
| | | | | 100/78 |
| 2012/0189417 | A1 * | 7/2012 | Blough ............... | A01F 15/0883 |
| | | | | 701/49 |
| 2015/0039269 | A1 * | 2/2015 | Mejegard ............... | H04W 4/80 |
| | | | | 702/182 |
| 2017/0228145 | A1 | 8/2017 | Schneider et al. | |
| 2017/0287303 | A1 * | 10/2017 | Lang .................. | G08B 21/0275 |
| 2018/0314230 | A1 | 11/2018 | Adler et al. | |
| 2019/0223379 | A1 | 7/2019 | Gilmore et al. | |

FOREIGN PATENT DOCUMENTS

| | | | |
|---|---|---|---|
| EP | 3014979 | B1 | 5/2016 |
| WO | 2011012955 | A1 | 2/2011 |

* cited by examiner

METHOD FOR CONTROLLING WRAPPING OPERATIONS

TECHNICAL FIELD

This invention relates to a method for controlling wrapping operations in a wrapper for wrapping round bale. This invention also relates to a wrapping system for wrapping round bale.

BACKGROUND ART

A wrapping machine is an agricultural machine configured to apply a film around a bale, in order to protect it from external contamination and to avoid the disintegration of the formed bale.

Known solutions of wrapping machine disclose the presence of a frame and a pair of rollers, which are rotatably connected to the frame. The pair of rollers are movable closer to each other towards the bale, to cause a lift of the bale form the ground. Once the bale is up and supported by the pair of rollers, the rollers are put in rotation and the friction with the bale cause the movement of the bale too.

The wrapper also includes a satellite, moving around the bale during the wrapping operation. The satellite holds a film coil, which is unwound while the film is applied to an external surface of the bale.

Moreover, the wrapper includes a cutting unit, which is configured to cut the film and to hold the end of the film coil when the wrapping operation is finished.

All these solutions provide a control unit, configured to control the abovementioned operations on the wrapper. The wrapping machine includes a user interface, through which the operator can insert control input, to command the wrapping operations.

However, in some cases, it could be useful to use different wrapping machine in the same field to speed up the operation. Using these solutions, the operator has to be on the wrapping machine to control the machine through the user interface. In other words, these solutions require the operator to be always aside the machine.

In the technical field regarding the implements for tractor is known to use mobile device, remotely connected to the control unit of the implements in order to send command messages to the control unit, for instructing it to actuate certain operation of the implements.

Examples of these solutions are disclosed in the following documents: US2019223379A1, US2018314230A1, US2017228145A1, U.S. Ser. No. 10/234,837B2, U.S. Pat. No. 9,906,967B2 e U.S. Pat. No. 9,165,127B2. However, none of these documents disclosed or suggest how to solve the abovementioned technical problem with regards to the specific field of wrappers, which has his own particularity and necessities.

Also, other documents disclose solutions wherein a mobile device, remotely connected to the control unit of the implements, sends command messages to the control unit, for instructing it to actuate certain operations of the implements.

In particular, WO2011012955A1 regards a baler towed by a tractor and provided with a wrapper assembly. WO2011012955A1 discloses that the tractor includes a control console, which permits to control various functions of the baler, including the wrapper assembly. WO2011012955A1 further says that the console can operate in manual mode or automatic mode.

DE102014211712A1 regards an agricultural implement towed by a tractor and faces the problem of improving the control system arranged on the tractor, to allow the farmer to control the implement while he is physically positioned close to the implement, thus avoiding that he must go back and forth between the tractor console and the implement. As a solution to this problem, DE102014211712A1 suggests providing the control console with a mobile device, such as a tablet.

EP0792577A2 regards a wrapping machine, and substantially discloses those features which are typically present on a machine dedicated to wrapping bales, as opposed to a baler which is additionally provided with a wrapping facility.

However, these solutions have the drawback of not being versatile and of not allowing a reliable responsive control.

DISCLOSURE OF THE INVENTION

Scope of the present invention is to overcome the aforementioned drawbacks.

This scope is achieved by the method for controlling wrapping operations and by the wrapping system that overcome at least one of the aforementioned drawbacks.

This scope is achieved by the method for controlling wrapping operations and by the wrapping system according to the appended claims.

According to an aspect of the present disclosure, the description provides a method for controlling, through a mobile device, wrapping operations in a wrapper for wrapping a round bale with a film. Please observe that, in some embodiments, the method may be used to wrap also other type of bale, such as square bales.

The method is performed by a processor of the mobile device.

Preferably, the device is wearable by the user. For example, the mobile device is a tablet or smart phone.

The mobile device is a device that can be transported, moved from one place to another by the user. Therefore, the mobile device is not a remote device, because it must be able to be moved and preferably worn by the person who uses the machine (for example, the person who drives the tractor or who uses the wrapping machine in situ).

The method comprises a step of coupling the mobile device to a control unit of the wrapper. The step of coupling includes a step of sending a coupling signal to the control unit. This coupling signal may be a Bluetooth signal, a Wireless signal.

The method includes a step of receiving control inputs from a user, through an interaction of the user with the mobile device, for example a touch on the screen of the mobile device or a vocal command.

The method includes a step of elaborating the control inputs.

The method includes a step of generating, based on the control inputs, a command message.

In one embodiment, the command message is a single impulse to send an information in a certain moment in time. In other embodiments, the command message is a continuous signal.

The method includes a step of sending the command message to the control unit of the wrapper.

In one embodiment, the method includes a step of receiving, at the processor of the mobile device, operation data from the control unit of the wrapper. The operation data being representative of operations performed by the wrapper.

This feature allows the processor of the mobile device to control the wrapper depending on what is actually happening in the wrapper, because the mobile device receives a feedback on the operations.

Preferably, the processor is configured to control the wrapper based on the operation data received from the control unit of the wrapper.

The operations performed by the wrapper include one or more of the following operations:

opening a pair of rollers of the wrapper;

closing the pair of rollers of the wrapper;

opening a cutting unit of the wrapper;

closing the cutting unit of the wrapper;

rotating the pair of rollers;

rotating a wrapper satellite around the bale to be wrapped.

rotating a working table around a first axes, perpendicular to the ground, to apply the film on the bale;

rotating the working table around a second axis between a working position, wherein the working table arm support the bale during wrapping operation, and a lowering position, wherein the working table release the wrapped bale on the ground;

rotating a lifting arm around a respective hinge between a loading position, wherein the lifting arm is on the ground to catch the bale, and an unloading position, wherein the lifting arm is raised above the ground, to release the bale on the working table.

Said one or more operations being performed by respective actuators, which are controlled by the control unit of the wrapper through command signals.

In one embodiment, the command message includes instructions for instructing the control unit of the wrapper to carrying out at least one of said operations through the actuators. In fact, part of the command message includes a content in which the instructions to be send are stored.

In one embodiment, the instructions of the command message are configured for instructing the control unit of the wrapper to carrying out autonomously at least one of said operations through the actuators. In other words, in one embodiment, the command message includes instruction to start a certain action and to finish the action autonomously.

In one embodiment, the instructions of the command message are configured for instructing the control unit of the wrapper to carrying out autonomously a sequence of operations among said operations.

In one embodiment, the command message includes instruction to start a certain number of actions.

In other word, the instructions may instruct the control unit to perform an action or to instruct the control unit to trigger also autonomously the start of a sequence of actions.

In one embodiment, the operation data is representative of the wrapping of a bale. The processor counts the number of wrapped bales in a predetermined interval of time. The processor counts the total number of bales wrapped since a first instant, to determine a first number of wrapped bales. The processor counts the total number of bales wrapped since a second instant, to determine a second number of wrapped bales. In one embodiment, the processor set the number of wrapped bales counted to zero. In one embodiment the processor may set to zero the first number of wrapped bales, while the processor cannot set to zero the second number of wrapped bales.

In one embodiment, the instructions of the command message are configured for instructing the control unit of the wrapper to actuate the wrapper satellite at the desired operational parameter. In particular, in one embodiment, the desired operational parameter is a desired rotation speed. In other words, the command message instructs the control unit to rotate the satellite at the desired rotation speed around the bale.

In one embodiment, the desired operational parameter is a desired turns number of the wrapper satellite.

In one embodiment, the desired operational parameter is a desired rotation speed and/or a desired turns number of the wrapper satellite.

In one embodiment, the instructions of the command message are configured for instructing the control unit of the wrapper to rotate the wrapper satellite at the desired rotation speed. In one embodiment, the instructions of the command message are configured for instructing the control unit of the wrapper to perform the desired turns number of the wrapper satellite.

In one embodiment, the processor is configured to send the command message for instructing the control unit of the wrapper to perform a specific operation on the wrapper as long as the control input, representative of said specific operation, is continuously received by the processor, to perform the specific operation only when the user is actively sending the respective control input. In other words, the operation is performed as long as the input that control said operation is continuously pressed (or more generally continuously send).

In one embodiment, the method comprises a step of displaying, wherein the processor generates graphic data. The processor displays the graphic data in a user interface (a display of the mobile device) of the mobile device. The graphic data render on the display one or more graphic element, representative of the operation data received from the control unit of the wrapper. The graphic data render on the display one or more input button, to allow the user to insert the control input.

In one embodiment, said one or more input button includes one or more of the following buttons:

a rollers button, to set control input representative of an action to be done by the pair of rollers;

a satellite button, to set control input representative of an action to be done by the wrapper satellite;

a cutting button, to set control input representative of an action to be done by the cutting unit of the wrapper;

an automation button, to set control input representative of a command message for instructing the control input to perform operations autonomously.

In one embodiment, the command message is sent through an open Bluetooth connection to a Bluetooth interface, implemented in a CAN Bus of the wrapper control unit.

Please observe that any type of wireless connection may be used and that the Bluetooth connection is just one example of wireless connection.

In one embodiment, the command message includes an address. The address is univocally associated to the mobile device.

According to one aspect of the present disclosure, the present description provides a mobile device for controlling wrapping operations. The mobile device includes a processor, configured to perform the steps of the method of the present document.

The mobile device includes a user interface. The user interface includes one or more input button. Said one or more input button are configured to send control input to the processor. The user interface includes a display, configured to receive graphic data from the processor, to show information about the wrapping operations.

According to one aspect of the present disclosure, the present description provides a wrapping system.

The wrapping system comprises a film coil, including a film to be applied around the bale. The wrapping system comprises a pair of rollers, movable between a working position, wherein they rotate to support and put in rotation the bale under wrapping, and a rest position, wherein the wrapped bale is released on the ground.

The wrapping system comprises a wrapper satellite. The wrapper satellite is connected to the film coil. The wrapper satellite is movable around the bale to apply the film on the bale.

In one embodiment, the wrapping system comprises a cutting unit, configured to cut the film. The wrapping system comprises a control unit, configured to control operations of the wrapper.

In other embodiments, the wrapper includes a working table. The working table supports the bale during wrapping operations. The working table is configured to rotate around a first axis. The first axis is preferably perpendicular to the ground. The wrapper satellite is stationery and holds the coil film. Hence, rotating with the working table, the bale pulls the film from the coil.

In one embodiment, the working table is configured to rotate around a second axis for lowering the wrapped bale on the ground. In particular, the working table is configured to rotate around the second axis between a working position, wherein the working table arm support the bale during wrapping operation (and wherein the working table is configured to rotate around the first axis), and a lowering position, wherein the working table release the wrapped bale on the ground. The lowering of the bale is caused by the inclination of the working table. Hence, the bale falls on the ground due to the gravity force.

In one embodiment, the wrapper comprises a lifting arm, configured to lift the bale from the ground on the working table. In particular, the lifting arm is configured to rotate around a respective hinge (or a respective rotational axis) between a loading position, wherein the lifting arm is on the ground to catch the bale, and an unloading position, wherein the lifting arm is raised above the ground, to release the bale on the working table.

In one embodiment, the system comprises a mobile device according to one or more of the features described in the present disclosure.

In one embodiment, the control unit includes a receiver, configured to receive command message from the mobile device.

The control unit includes a main user interface, configured to allow the insertion of a main command message.

The control unit includes a main processor, configured to receive the main command message from the main user interface and/or the command message from the mobile device. The main processor is configured to generates command signals, as a function of the main command message and/or the command message, to control the operations of the wrapper.

The main command message includes a first address. The command message includes a second address. In one embodiment, the second address is different from the first address.

BRIEF DESCRIPTION OF DRAWINGS

This and other features of the invention will become more apparent from the following detailed description of a preferred, non-limiting example embodiment of it, with reference to the accompanying drawings, in which.

6

Figure 1:
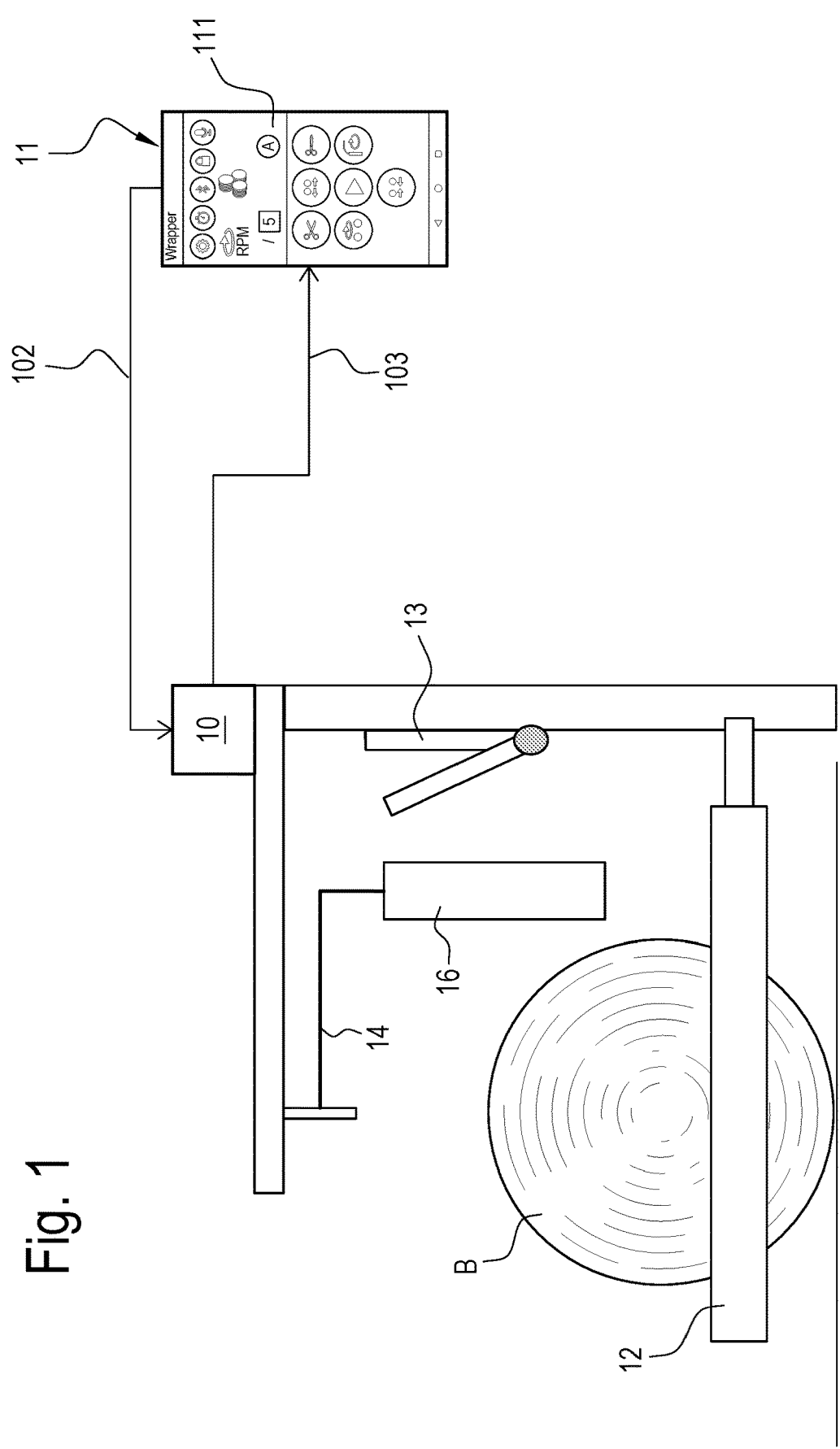
FIG. 1 illustrates a schematic view of a wrapping system.
Figure 2B:
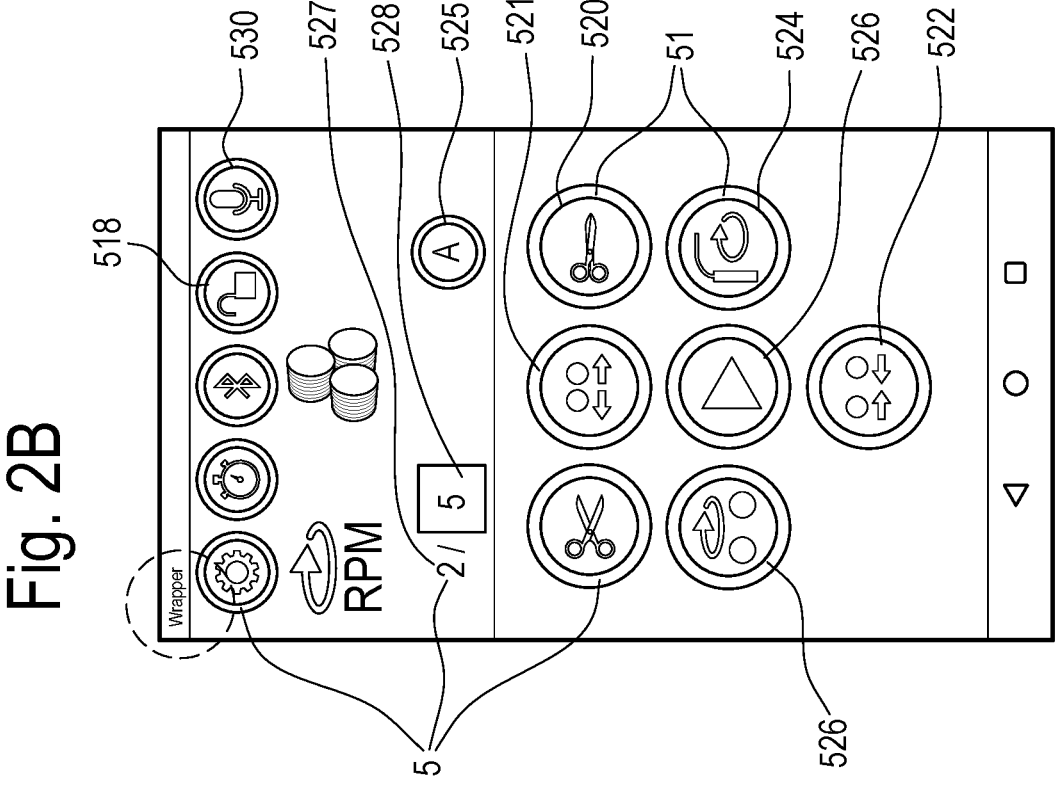
Figure 2A:
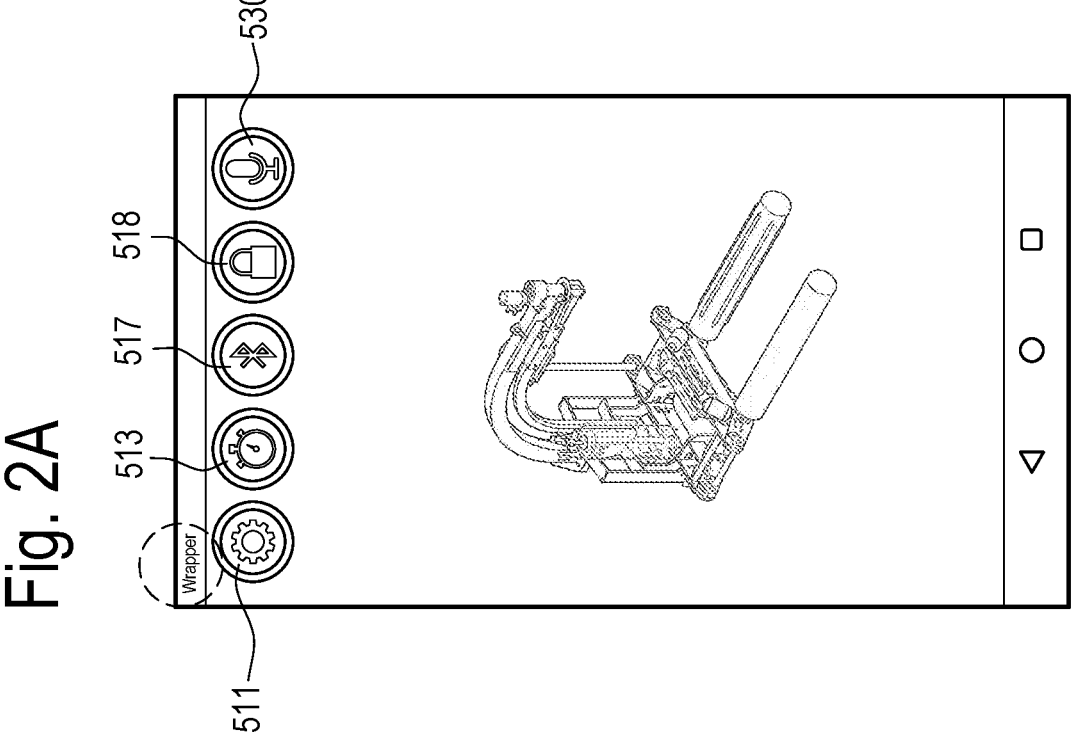
Figures 2C, 2D:
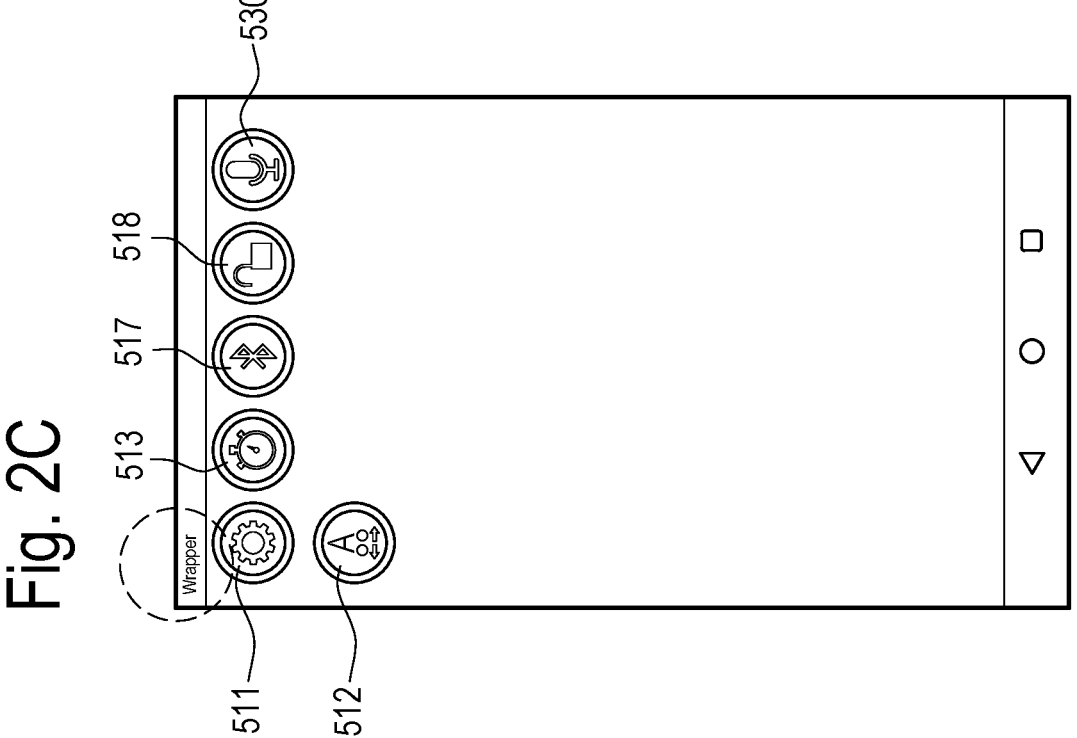
Figure 3:
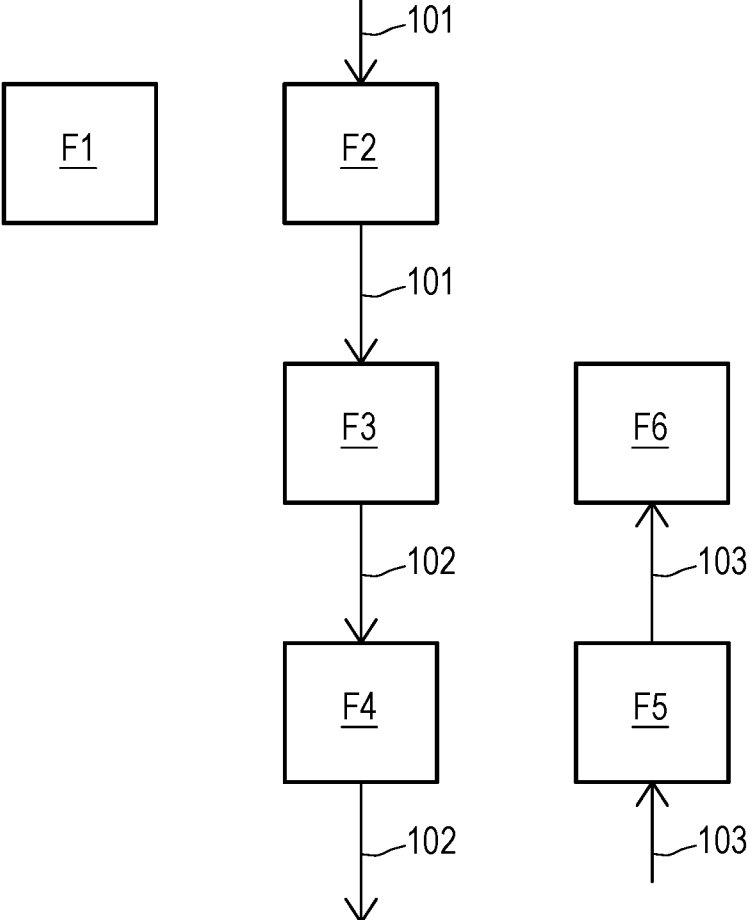

FIGS. 2A, 2B, 2C and 2D illustrate a first, a second, a third and a fourth screen view of a mobile device of the wrapping system of FIG. 1;

FIG. 3 illustrates a schematic view of a method for controlling a wrapping system.

DETAILED DESCRIPTION OF PREFERRED EMBODIMENTS OF THE INVENTION

According to the attached figures, the present disclosure provides a method for controlling, through a mobile device 11, wrapping operations in a wrapper (system) 1 for wrapping a round bale B with a film.

The method includes a step of coupling F1. In the step of coupling F1, the mobile device 11 is connected (synchronized, coupled) with a control unit 10 of the wrapping system 1. The mobile device 11 send to the control unit a coupling signal, that is univocally linked to the mobile device 11. The control unit 10 of the wrapping system 1 controls the coupling signal and, based on the coupling signal, allows a connection with the mobile device 11. In one embodiment, once the mobile device 11 is connected to the control unit 10, the mobile device 11 is capable of controlling the wrapping operations as well as the control unit 10. The coupling signal is received through a Bluetooth interface (or wireless interface). The Bluetooth interface is connected with a CAN Bus, which is connected to a main processor of the control unit 10, to send the coupling signal to the main processor.

In one embodiment, the method includes a step of receiving F2 control inputs 101. The control inputs 101 are representative of controls inserted by on operator through the mobile device 11, preferably trough a display 111 of the mobile device 11. In other words, in one embodiment, the operator touches the display 111, emits a vocal sound or interacts with the mobile device 11 to send control input to the processor of the mobile device 11.

In one embodiment, the method comprises a step of elaborating the control inputs 101. The method comprises a step of generating F3 of command message 102, as a function of the control inputs 101 (preferably previously elaborated).

In one embodiment, the method includes a step of sending F4 the command message 102 to the control unit 10 of the wrapping system 1.

The command message 102 is received in the control unit 10 through the Bluetooth interface, which is connected to the CAN Bus and to the main processor.

In one embodiment, the method includes a step of receiving F5, at the processor of the mobile device 11, operation data 103, representative of operations performed by the wrapping system.

The operations performed by the wrapping system include one or more of the following operations:

opening a pair of rollers 12 of the wrapping system 1;
closing the pair of rollers 12 of the wrapping system 1;
opening a cutting unit 13 of the wrapping system 1;
closing the cutting unit 13 of the wrapping system 1;
rotating the pair of rollers 12 of the wrapping system 1;
rotating a wrapper satellite 14 around the bale B to be wrapped.

The method includes a step of displaying F6 commands on the display 111. In particular, the processor of the mobile device 11 generates graphic data. The graphic data are rendered on the display 111 to display one or more graphic elements 5. Said one or more graphic elements include a group of command elements 51, which are used to insert the control inputs, and a group of displaying element 52, which are used to display parameter of the wrapping operations, determined as a function of the operation data 103.

In one embodiment, the group of commands includes a setting button 511. The setting button 511 is clickable and when the operator clicks on the setting button 511, the processor display on the screen a first automation button 512.

The first automation button 512 allows to perform a certain operation of the wrapping system 1 autonomously (or automatically). In particular, according to an embodiment, responsive to a click of the first automation button 512, the processor generates a command message to instruct the control unit 10 of the wrapping system 1 in performing the pair of rollers 12 opening autonomously (or automatically). However, the first automation button 512 may be used to instruct the control unit 10 of the wrapping system 1 in performing autonomously (or automatically) any action performed by the wrapper.

In one embodiment, the group of commands includes a counting button 513.

The counting button 513 is clickable and when the operator clicks on the counting button 513, the processor display on the screen a first label 514 and/or a second label 515.

The first label 514 displays the number of wrapped bales in a first interval of time. The second label 515 displays the number of wrapped bales in a second interval of time, greater than the first interval of time.

In one embodiment, the group of commands includes a counting reset button 516. The counting reset button 516 is clickable and when the operator clicks on the counting reset button 516, the first label is set to zero. In other words, the number of wrapped bales in the first interval of time is set to zero.

In one embodiment, the group of commands includes a coupling button 517. The coupling button 517 is clickable and when the operator clicks on the coupling button 517, the processor sends the coupling signal to the control unit 10 of the wrapping system.

In one embodiment, the group of commands includes an operations button 518. The operations button 518 is clickable and when the operator clicks on the operations button 518, the processor displays one or more control buttons.

Said one or more control button includes a cutting opening button 519. The cutting opening button 519 is clickable and when a user clicks on the cutting opening button 519, the processor sends to the control unit 10 of the wrapper a command message 102 to instruct the control unit 10 to perform the opening of the cutting unit 13 of the wrapping system 1.

Said one or more control button includes a cutting closing button 520. The cutting closing button 520 is clickable and when a user clicks on the cutting closing button 520, the processor sends to the control unit 10 of the wrapper a command message 102 to instruct the control unit 10 to perform the closing of the cutting unit 13 of the wrapping system 1.

Said one or more control button includes a rollers opening button 521. The rollers opening button 521 is clickable and when a user clicks on the rollers opening button 521, the processor sends to the control unit 10 of the wrapper a command message 102 to instruct the control unit 10 to perform the opening of the pair of rollers 12 of the wrapping system 1.

Said one or more control button includes a rollers closing button 522. The rollers closing button 522 is clickable and when a user clicks on the rollers closing button 522, the processor sends to the control unit 10 of the wrapper a command message 102 to instruct the control unit 10 to perform the closing of the pair of rollers 12 of the wrapping system 1.

Said one or more control button includes a rollers rotation button 523. The rollers rotation button 523 is clickable and when a user clicks on the rollers rotation button 523, the processor sends to the control unit 10 of the wrapper a command message 102 to instruct the control unit 10 to put in rotation the pair of rollers 12 of the wrapping system 1.

Said one or more control button includes a satellite rotation button 524. The satellite rotation button 524 is clickable and when a user clicks on the satellite rotation button 524, the processor sends to the control unit 10 of the wrapper a command message 102 to instruct the control unit 10 to put in rotation the wrapper satellite 14 of the wrapping system 1.

Said one or more control button includes a second automation button 525. The second automation button 525 is clickable and when a user clicks on the second automation button 525, the processor sends to the control unit 10 of the wrapper a command message 102 to instruct the control unit 10 to perform automatically a sequence of wrapping operations among the wrapping operations.

Said one or more control button includes a starter button 526. The starter button 526 is clickable and when a user clicks on the starter button 526, the processor sends to the control unit 10 of the wrapper a command message 102 to instruct the control unit 10 to start the sequence of wrapping operations that the control unit 10 control automatically without any other control inputs 101.

In one embodiment, said one or more control button have to be kept pressed continuously while the correspondent wrapping operation is performed. In other words, when clicking one of said one or more control button, the correspondent wrapping operation is performed only if the button is continuously pressed until the operation is finished.

When the operator clicks on the operations button 518, the processor displays a turn counting label 527, displaying the number of turns performed on the bale B by the wrapper satellite 14.

Said one or more control button includes a satellite turns button 528. The satellite turns button 528 is clickable and when a user clicks on the satellite turns button 528, the operator can set a desired number of turns that the wrapper satellite 14 should perform around the bale. When a user clicks on the satellite turns button 528, the processor sends to the control unit 10 of the wrapper a command message 102 to instruct the control unit 10 to perform a number of turns of the wrapper satellite 14 around the bale B equal to the desired number of turns.

When the operator clicks on the operations button 518, the processor displays a speed label 529, displaying the rotational speed of the pair of rollers 12 or/and of the wrapper satellite 14.

In one embodiment, the group of commands includes a vocal button 530. When the vocal button 530 is clicked, the mobile device 11 activates a microphone to receive audio data from the operator, to control the wrapping system using vocal commands.

According to one aspect of the present description, the command message 102 is created according to ISO11873. In particular, the command message 102 includes a first part, indicating the start of the frame. The command message 102 includes a second part, indicating the length of the command message 102. The command message 102 includes a third part, having a value representative of the command type. The command message 102 includes a fourth part, representative of the address sending the command message 102.

The command message 102 includes a fifth part, representative of the content of the command message 102. In other words, the fifth part of the command message 102 is representative of the instruction that the processor wants to send to the control unit 10 of the wrapping system 1. The command message includes a sixth part, representing a checksum of the command message 102. Finally, the command message 102 include the end of the frame.

According to one aspect of the present disclosure, the method provides a step for controlling conflict of command message between the mobile device 11 and a main user interface, placed on the wrapper.

In the step of conflict control, the control unit 10 receive the command message 102 from the mobile device 11 and a main command message from the main user interface. The main command message includes an address that is different from the address of the command message 102. In this way, the control unit 10 knows who is sending the message avoiding the conflict.

In other embodiments, the main command message and the command message 102 have the same address. In this embodiment, the processor of the mobile device 11 or the main user interface send a notification indicating that two different devices are connected to the control unit 10. In the notification, the operator can choose which device should be disconnect and which one should be keep connected with the control unit 10, to control the wrapping system 1.

The invention claimed is:

1. A method for controlling, through a mobile device, wrapping operations in a wrapping machine, the wrapping machine having a pair of rollers configured to rotate to support and put in rotation a round bale under wrapping and a wrapper satellite connected to a film coil and movable around the round bale to apply the film on the bale to completely wrap the round bale with the film and including a control unit and actuators, the actuators being controlled by the control unit for wrapping the bale with the film, the method comprising the following steps, performed by a processor of the mobile device:

coupling the mobile device to a control unit of the wrapper, by sending a coupling signal to the control unit;

receiving control inputs from a user, through an interaction of the user with the mobile device;

elaborating the control inputs and generating, based on the control inputs, a command message including instructions for instructing the control unit of the wrapping machine to command the actuators;

sending the command message to the control unit of the wrapper;

receiving, at the processor of the mobile device, operation data from the control unit of the wrapper, the operation data being representative of operations performed by the wrapping machine, wherein the mobile device is wearable by the user; and displaying graphic command elements on a display of the mobile device allowing the user to insert the control input, wherein the graphic command elements include a clickable coupling button, wherein when the operator clicks on the coupling button, the processor sends the coupling signal to the control unit of the wrapping system, and a satellite turns button, wherein the method includes a step of clicking, by the user, on the satellite turns button, to set a desired number of turns that the wrapper satellite should perform around the bale, and wherein the processor sends to the control unit of the wrapper a command message to instruct the control unit to perform a number of turns of the wrapper satellite around the bale equal to the desired number of turns when the satellite turns button is clicked.

2. The method according to claim 1, wherein the operations performed by the wrapper include one or more of the following operations:

opening a pair of rollers of the wrapper;

closing the pair of rollers of the wrapper;

opening a cutting unit of the wrapper;

closing the cutting unit of the wrapper;

rotating the pair of rollers;

rotating the wrapper satellite around the bale to be wrapped;

rotating a working table around a first axes, perpendicular to the ground;

rotating the working table around a second axis between a working position, wherein the working table arm supports the bale during wrapping operation, and a lowering position, wherein the working table releases the wrapped bale on the ground;

rotating a lifting arm around a respective hinge between a loading position, wherein the lifting arm is on the ground to catch the bale, and an unloading position, wherein the lifting arm is raised above the ground, to release the bale on the working table, said one or more operations being performed by respective actuators, which are controlled by the control unit of the wrapper through command signals.

3. The method according to claim 2, wherein the command message includes instructions for instructing the control unit of the wrapper to carry out at least one of said operations through the actuators.

4. The method according to claim 3, wherein the instructions of the command message are configured for instructing the control unit of the wrapper to carry out autonomously at least one of said operations through the actuators.

5. The method according to claim 3, wherein the instructions of the command message are configured for instructing the control unit of the wrapper to carry out autonomously a sequence of operations among said operations.

6. The method according to claim 3, wherein the instructions of the command message are configured for instructing the control unit of the wrapper to actuate the wrapper satellite with a desired operational parameter.

7. The method according claim 6, wherein the desired operational parameter is a desired rotation speed or a desired turns number of the wrapper satellite, and wherein the instructions of the command message are configured for instructing the control unit of the wrapper to rotate the wrapper satellite at the desired rotation speed or for performing the desired turns number of the wrapper satellite.

8. The method according to claim 1, comprising a step of counting, wherein the operation data is representative of the wrapping of a bale and wherein the processor counts the number of wrapped bales in a predetermined interval of time.

9. The method according to claim 8, comprising a step of resetting, wherein the processor sets the number of wrapped bales to zero.

10. The method according to claim 1, wherein the processor is configured to send the command message for instructing the control unit of the wrapper to perform a specific operation on the wrapper as long as the control input, representative of said specific operation, is continuously received by the processor, to perform the specific operation only when the user is actively sending the respective control input.

11. The method according to claim 1, comprising a step of displaying, wherein the processor generates graphic data and displays the graphic data in a display of the mobile device to provide the user with:

one or more displaying element, representative of the operation data received from the control unit of the wrapper;

one or more input button, to allow the user to insert the control input.

12. The method according to claim 11, wherein said one or more input button includes:

rollers buttons, to set control input representative of an action to be done by the pair of rollers;

satellite buttons, to set control input representative of an action to be done by the wrapper satellite;

cutting buttons, to set control input representative of an action to be done by the cutting unit of the wrapper;

automation buttons, to set control input representative of a command message for instructing the control unit to perform operations autonomously.

13. The method according to claim 1, wherein the command message is sent through an open Bluetooth connection to a Bluetooth interface, implemented in a CAN Bus of the wrapper control unit.

14. The method according to claim 1, wherein the command message includes an address and wherein the address is univocally associated to the mobile device.

15. The method according to claim 1, wherein the mobile device is wearable by the user.

16. The method according to claim 1, wherein the graphic command elements include a clickable setting button, wherein when the operator clicks on the setting button, the processor of the mobile device displays on the display a first automation button, the first automation button allows to perform a certain operation of the wrapping machine autonomously.

17. The method according to claim 1, wherein the graphic command elements include a clickable counting button and, when the operator clicks on the counting button, the processor displays on the display a first label and/or a second label wherein the first label displays the number of wrapped bales in a first interval of time, and the second label displays the number of wrapped bales in a second interval of time, greater than the first interval of time.

18. The method according to claim 17, wherein the graphic command elements include a clickable counting reset button, wherein, when the operator clicks on the counting reset button, the first label is set to zero.

19. The method according to claim 1, wherein the graphic command elements include a clickable operations button, wherein, when the operator clicks on the operations button, the processor displays one or more control buttons.

20. The method according to claim 19, wherein the graphic command elements include a clickable cutting closing button, wherein, when a user clicks on the cutting closing button, the processor sends to the control unit of the wrapper a command message to instruct the control unit to perform the closing of a cutting unit of the wrapping system.

21. The method according to claim 1, wherein the graphic command elements include a clickable rollers opening button, wherein when a user clicks on the rollers opening button, the processor sends to the control unit of the wrapper a command message to instruct the control unit to perform the opening of the pair of rollers of the wrapping system.

22. The method according to claim 1, wherein the graphic command elements include a clickable rollers closing button wherein when a user clicks on the rollers closing button, the processor sends to the control unit of the wrapper a command message to instruct the control unit to perform the closing of the pair of rollers of the wrapping system.

23. A method for controlling, through a mobile device, wrapping operations in a wrapping machine, the wrapping machine having a pair of rollers configured to rotate to support and put in rotation a round bale under wrapping, the wrapping machine being configured to completely wrap the round bale with a film and including a control unit and actuators, the actuators being controlled by the control unit for wrapping the bale with the film, the method comprising the following steps, performed by a processor of the mobile device:

coupling the mobile device to a control unit of the wrapper, by sending a coupling signal to the control unit;

receiving control inputs from a user, through an interaction of the user with the mobile device;

elaborating the control inputs and generating, based on the control inputs, a command message including instructions for instructing the control unit of the wrapping machine to command the actuators;

sending the command message to the control unit of the wrapper;

receiving, at the processor of the mobile device, operation data from the control unit of the wrapper, the operation data being representative of operations performed by the wrapping machine, wherein the mobile device is wearable by the user; and displaying graphic command elements on a display of the mobile device to allowing the user to insert the control input, wherein the graphic command elements include a clickable coupling button, wherein when the operator clicks on the coupling button, the processor sends the coupling signal to the control unit of the wrapping system, and a wrapping turns button, wherein the method includes a step of clicking, by the user, on the wrapping turns button, to set a desired number of turns that the wrapper should perform around the bale, and wherein the processor sends to the control unit of the wrapper a command message to instruct the control unit to perform a number of turns of the wrapper around the bale equal to the desired number of turns when the turns button is clicked.

* * * * *